(12) United States Patent
Thompson

(10) Patent No.: US 9,944,381 B2
(45) Date of Patent: Apr. 17, 2018

(54) LOAD TRANSFER APPARATUS FOR TRANSFERRING LOADS IN AN AIRCRAFT STRUCTURE

(71) Applicant: AIRBUS OPERATIONS LIMITED, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 210 days.

(21) Appl. No.: 15/072,399

(22) Filed: Mar. 17, 2016

(65) Prior Publication Data

US 2016/0272297 A1   Sep. 22, 2016

(30) Foreign Application Priority Data

Mar. 17, 2015   (GB) .................................. 1504467.0

(51) Int. Cl.
  *B64C 3/26*   (2006.01)
  *B64C 3/56*   (2006.01)

(52) U.S. Cl.
  CPC . *B64C 3/26* (2013.01); *B64C 3/56* (2013.01)

(58) Field of Classification Search
  CPC   B64C 3/26; B64C 3/56; B64C 23/076; B64C 23/072; B64C 23/069
  See application file for complete search history.

(56) References Cited

U.S. PATENT DOCUMENTS 5,452,867 A * 9/1995 Grunwald ................. B64C 3/24
                                                       156/173
7,975,965 B2 * 7/2011 Ackermann ............... B64C 3/18
                                                       244/124
9,296,471 B2 * 3/2016 Sakurai ..................... B64C 9/00
9,481,446 B2 * 11/2016 Lassen ...................... B64C 3/56
2005/0247756 A1   11/2005 Frazer et al.

(Continued)

FOREIGN PATENT DOCUMENTS

WO     2005098241 A1   10/2005
WO     2012131335 A2   10/2012

OTHER PUBLICATIONS

Search Report dated Jul. 12, 2016 in European application No. 16160523.

(Continued)

*Primary Examiner* — Justin M Benedik
(74) *Attorney, Agent, or Firm* — Hauptman Ham, LLP

(57) ABSTRACT

An aircraft wing comprising a load transfer apparatus arranged to transfer transverse shear loads from a first component such as a wing skin to a second, adjacent component such as a wing skin. The apparatus comprises a master interlock, and a plurality of slave interlocks. Each master interlock comprises a master male member received in a master female member to form the master interlock. Each of the plurality of slave interlocks comprises a slave male member received in a corresponding female member to form the slave interlocks. The master male and female members are sufficiently stiff that the master male member and the master female member are fixed, whereas the slave male and/or female members are less stiff than the master male and female members such that the slave male and/or female members are able to tolerate some movement, in the transverse direction.

13 Claims, 5 Drawing Sheets

(56) References Cited

U.S. PATENT DOCUMENTS

2007/0018049 A1* 1/2007 Stuhr .................... B64C 23/069
 244/124
2008/0210821 A1* 9/2008 Tanner .................... B64C 3/182
 244/123.3
2014/0008493 A1 1/2014 Whitlock et al.

OTHER PUBLICATIONS

Search Report in Great Britain Application No. 1504467.0 dated Sep. 18, 2015.

* cited by examiner

LOAD TRANSFER APPARATUS FOR TRANSFERRING LOADS IN AN AIRCRAFT STRUCTURE

RELATED APPLICATIONS

The present application claims priority from Great Britain Application No. 1504467.0, filed Mar. 17, 2015, the disclosure of which is hereby incorporated by reference herein in its entirety.

BACKGROUND OF THE INVENTION

The present disclosure relates to a load transfer apparatus for transferring loads in an aircraft structure (for example a wing), and particularly to a load transfer apparatus for transferring shear loads (for example transverse shear loads in a wing). The disclosure also relates to a method of designing a load transfer apparatus.

It is known to transfer loads between two components, using a multiplicity of interlocks. Each interlock typically comprises a male member received in a female member. The male/female members tend to be sufficiently stiff that if there is play between the male and/or female member in an interlock (which may arise due to wear, tolerances, deflections etc.) then that interlock no longer acts to transfer loads, and the loads are borne by the remaining interlocks. For safety critical applications, it is necessary to provide multiple redundant interlocks (in effect, one assumes that only a percentage of the total number of interlocks will be acting to transfer load at any one time). However, having redundant interlocks in this manner can add extra weight/bulk to the load transfer apparatus.

It is often necessary to safely and reliably transfer loads within an aircraft structure. For example, some aircraft are provided with wing tip devices which may be folded to reduce the span of the aircraft on the ground (compared to when the aircraft is configured for flight). The wing tip devices may, for example, be configurable between: (i) a flight configuration for use during flight and (ii) a ground configuration for use during ground-based operations, in which ground configuration the wing tip device is moved away from the flight configuration such that the span of the aircraft is reduced. It may be desirable to transfer loads between the wing and wing tip device in such an aircraft. For example it may be desirable to transfer torsional loads, between the wing and the wing tip device.

The present invention seeks to provide an improved load transfer apparatus, especially (but not necessarily exclusively) for transferring loads in an aircraft wing.

SUMMARY OF THE INVENTION

According to a first aspect of the invention, there is provided an aircraft structure comprising a load transfer apparatus arranged to transfer shear loads acting in a first direction from a first component to a second, adjacent, component, the apparatus comprising a master interlock, and a plurality of slave interlocks, the master interlock comprising a master male member associated with the first or second component, received in a master female member associated with the other of the first or second component, to form the master interlock, and each of the plurality of slave interlocks comprising a slave male member associated with the first or second component, received in a corresponding female member associated with the other of the first or second component, to form the slave interlocks, wherein the master male and female members are sufficiently stiff that the master male member and the master female member are fixed relative to their respective first and second component, whereas each slave male member is less stiff than the master male member such that the slave male members are able to tolerate some movement, in the first direction, thereby enabling both the slave interlocks and the master interlock to transfer some of the shear loads between the components even when there is play in the master interlock.

By providing slave male and/or female members that are less stiff than the master male and female members, the slave male and/or female members are able to tolerate some movement in the first direction. When there is play in the master interlock (for example which may occur due to misalignment of the male and female members due to wear, tolerances, deflections etc.) the slave interlocks are able to act to accommodate movement such that all the interlocks (slave and master) still transfer the first shear loads between the components. This may enable the load transfer apparatus to have relatively few redundant master interlocks because it can be assumed that the master and slave interlocks both act to transfer load even when play develops in the master interlock. This may, for example, facilitate a relatively lightweight apparatus.

The master and slave male members may all be associated with the first component. The master and slave female members may all be associated with the second component. Having an arrangement in which all the male members are associated with one of the components and all the female members are associated with another of the components facilitates a simple arrangement.

The stiffness of the members in each interlock is preferably the stiffness in the first direction (i.e. the direction that the shear load acts).

There are a number of ways to ensure the stiffness of the slave male and/or female members (herein after referred to as the "slave members") is less than the stiffness of the master male and/or female members (herein after referred to as the "master members"). For example, the shape of the slave members may be different to the shape of the master members; the slave members may comprise a necked region configured to reduce the stiffness of the slave members. The slave members may be attached to their respective component in a different manner to the master members. For example, the master members may be attached via multiple fixings, such as a three-point fixing, whereas the slave members may be attached via fewer fixings, such as a two-point fixing. In some embodiments, the slave members may comprise a material with a lower stiffness than the material of the master members.

The slave members and master members are associated with the first or second component. It will be appreciated that the slave members and master members need not necessarily be directly connected to the respective component. For example, the male members may be attached to their respective component via a spreader plate. The female members may be attached to their respective component via a spreader plate. Such an arrangement mitigates the creation of load concentrations in the component. The spreader plate may also provide a wear surface such that the component is protected, and/or facilitate matching/alignment of the master & slave members during the assembly processes.

In principle, embodiments of the invention may comprise slave male and slave female members that are less stiff than the master male and female members. In preferred embodiments however, only the slave male members are less stiff than the master male member. The female slave members may be sufficiently stiff that they are fixed to their respective component. The slave male members may be less stiff than the master male member such that the slave male members are able to tolerate the movement, in the first direction.

The male members may comprise a tapered region for insertion in a corresponding tapered region of the respective female member. The tapered region may, for example, be a trapezoidal region. The male members may comprise two opposing transverse tapering surfaces that, in the interlock, are configured to abut two corresponding transverse tapering surfaces of the respective female members.

The arrangement may comprise a plurality of the master interlocks. The arrangement may comprise a multiplicity of the slave interlocks. There may be more slave interlocks than master interlocks.

The interlocks are preferably such that the male members are moveable (for example slideably moveable) into/out of the female members in a direction that is perpendicular to the first direction (for example in embodiments in which the first direction is a transverse direction, the members may be moveable in the longitudinal direction). The first and second components may therefore be moved together/apart in this direction in order to engage/disengage the interlocks. Such an arrangement is especially attractive where one of the first or second components is on wing tip device, and the other is on an inner wing because the component of the wing tip device may be moved (at least initially) in a longitudinal direction when the tip device is being folded into a ground configuration. The wing tip device may be configurable between: (i) a flight configuration for use during flight and (ii) a ground configuration for use during ground-based operations, in which ground configuration the wing tip device is moved away from the flight configuration such that the span of the aircraft wing is reduced.

In preferred embodiments of the invention, the structure may be a wing, and the wing may comprise an inner wing and a wing tip device on the tip of the inner wing. The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of an inner wing. The leading edge of the wing tip device is preferably a continuation of the leading edge of the inner wing. There is preferably a smooth transition from the inner wing to the wing tip device. It will be appreciated that there may be a smooth transition, even where there are changes in sweep or twist at the junction between the inner wing and wing tip device. However, there are preferably no discontinuities at the junction between the inner wing and wing tip device. The upper and the lower surfaces of the wing tip device may be continuations of the upper and lower surfaces of the inner wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The first component may be a wing skin. The second component may be an adjacent wing skin. The present invention has been found to be particularly effective for embodiments in which the first and second components are wing skins. The wing skins are preferably wing skins on the lower surface of the wing.

In embodiments in which the structure is a wing, the aircraft may comprise a second load transfer apparatus on the upper part of the wing for transferring loads in this upper part of the wing. For example, the wing may be subjected to torsional loads that necessitate the transfer of transverse shear loads between the wing skins on both the upper and lower surfaces of the wing (the shear loads acting in opposite directions on the upper and lower surfaces). In embodiments in which one of the first or second wing skins is on wing tip device, the second load transfer apparatus may comprise a hinge about which the wing tip device may be rotated.

The load transfer apparatus is arranged to transfer shear loads in a first direction. The first direction is preferably a transverse direction. In embodiments in which the components are wing skins, each wing skin may have a longitudinal direction and a transverse direction. The transverse direction is typically chordwise. The longitudinal direction is typically spanwise.

According to second aspect of the invention, there is provided an aircraft comprising the structure of the first aspect of the invention. The structure is preferably a wing.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to yet another aspect of the invention, there is provided a load transfer apparatus for use as the load transfer apparatus described herein. The apparatus comprises a master interlock, and a plurality of slave interlocks, the master interlock comprises a master male member for associating with a first or second component, and a master female member for receiving the master male member and for being associated with the other of the first or second component, to form the master interlock, and each of the plurality of slave interlocks comprises a slave male member for associating with the first or second component, and a corresponding female member for receiving the slave male member and for being associated with the other of the first or second component, to form the slave interlocks, wherein the master male and female members are sufficiently stiff that the master male member and the master female member are fixable relative to their respective first and second component, whereas each slave male member is less stiff than the master male member such that the slave male members are able to tolerate some movement, in the first direction, thereby enabling both the slave interlocks and the master interlocks to transfer some of the shear loads between the components even when there is play in the master interlock.

According to yet another aspect of the invention, there is provided a method of designing a load transfer apparatus for transferring shear loads in a first direction, from a first component to a second, adjacent, component, the apparatus comprising a master interlock, and a plurality of slave interlocks, the master interlock comprising a master male member for associating with the first or second component, and a master female member for receiving the master male member and for being associated with the other of the first or second component, to form the master interlock, and each of the plurality of slave interlocks comprising a slave male member for associating with the first or second component, and a corresponding female member for receiving the slave male member and for being associated with the other of the first or second component, to form the slave interlocks, wherein the master male and female members are sufficiently stiff that the master male member and the master female member are fixable relative to their respective first and second component, and wherein the method comprises the step of: designing each slave male member to be less stiff than the master male member, the stiffness being selected such that the slave male members are able to tolerate some movement, in the first direction, thereby enabling both the slave interlocks and the master interlocks to transfer some of the shear loads between the components even when there is play in the master interlock.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

An embodiment of the present invention will now be described by way of example only with reference to the accompanying schematic drawings of which.

DETAILED DESCRIPTION

Figure 1:
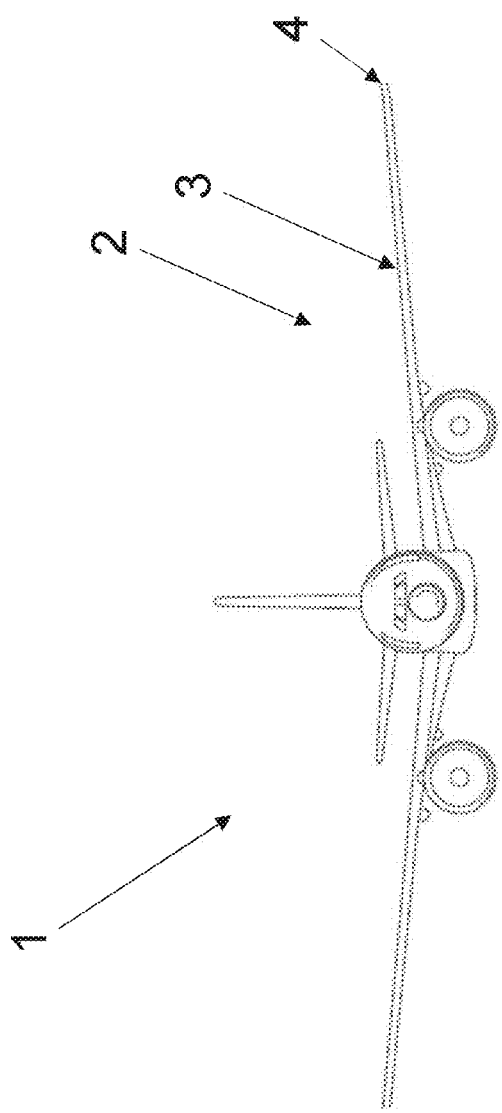
FIG. 1 shows a front view of the aircraft according to a first embodiment of the invention.

FIG. 1 is a frontal view an aircraft 1 according to a first embodiment of the invention. The aircraft 1 comprises a wing 2 having an inner wing 3 and a wing tip device 4 at the tip of the inner wing 3. The wing tip device 4 is in the form of a planar wing tip extension, and is configurable between: (i) a flight configuration for use during flight (see FIG. 1) and (ii) a ground configuration (not shown) for use during ground-based operations, in which ground configuration the wing tip device is folded upwards about a hinge (not shown), away from the flight configuration, such that the span of the aircraft wing is reduced.

When the wing tip device 4 is in the flight configuration it is necessary for loads to be able to be transferred from the wing tip device 4 into the inner wing 3. For example, torsional loads on the tip device 4 must be able to be transferred into the inner wing 3.

Torsional loads on the tip device 4 tend to result in transverse (which is also chordwise in this embodiment) shear loads being generated at the wing skin junction between the inner wing 3 and the wing tip device 4. Since these loads are arising as a result of a torsional load on the wing tip device, the transverse shear forces act in opposite directions across the respective junctions on the upper wing skin and on the lower wing skin.

In the first embodiment of the invention, the hinge (about which the wing tip device rotates to the ground configuration) acts to transfer the transverse shear loads at the junction on the upper wing skin. However, on the lower wing skin, the aircraft comprises a novel load transfer apparatus as will now be described with reference to FIGS. 2 to 6.

Figure 2:
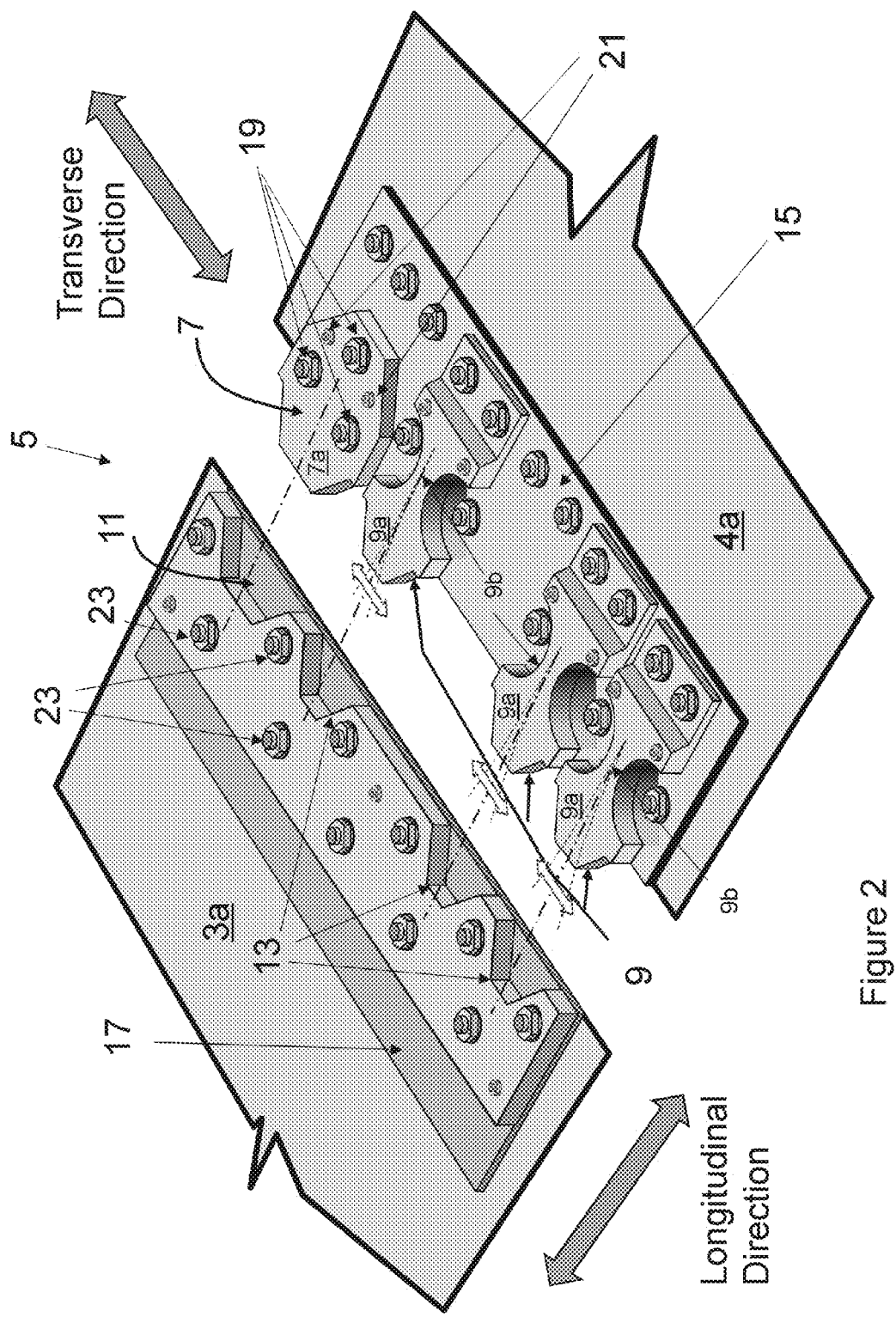
FIG. 2 shows a perspective view of a load transfer apparatus in the wing of the aircraft of FIG. 1.
Figure 5:
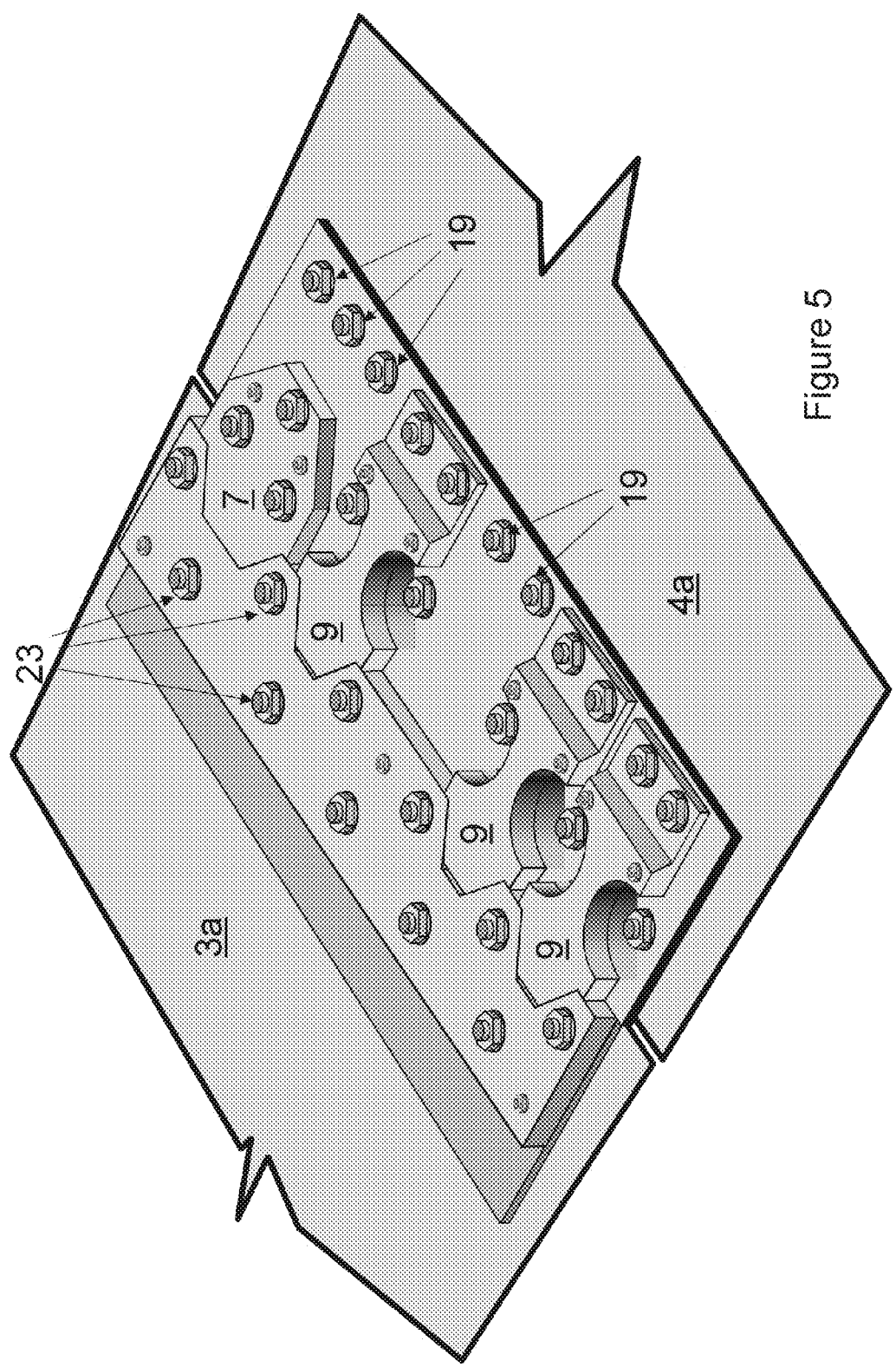
FIG. 5 shows a third stage of assembly of the apparatus in FIG. 2.

FIG. 2 shows a perspective view of the load transfer apparatus 5 in the first embodiment of the invention. For the sake of clarity, the wing skins and the male and female members (described in more details below) are shown separated apart from one another. However, it will be appreciated that during use, when the wing tip device is in the flight configuration, the wing skins will substantially abut and the male members are received in the female members to form the interlocks. The apparatus with the interlocks formed is shown in FIG. 5.

Referring to FIG. 2, the load transfer apparatus 5 comprises a master male member 7 and three slave male members 9 attached to the lower wing skin 4a of the wing tip device via a spreader plate 15. Each male member comprises a trapezoidal head 7a/9a comprising two transverse tapered edges. The head 7a of the master male member 7 is arranged to be received in corresponding master female member 11 and the heads 9a of the slave male members 9 are arranged to be received in corresponding slave female members 13.

The female members 11, 13 are formed by notches in a monolithic plate structure. Each female member 11/13 has tapered internal edges against which the tapered edges of the corresponding male member head 7a/9a may abut. The female members 11, 13 are attached to the wing skin 3a of the inner wing 3.

As the skilled person will readily appreciated from FIG. 2, when the wing skins 3a and 4a are placed in an abutting relationship (as they would be when the wing tip device is in the flight configuration), the male members 7, 9 are received in the female members 11, 13 to form respective master and slave interlocks.

The master male member 7 is a wide, plate-like structure and is fixed to the wing skin 4a via a three point fixing 19, and to the spreader plate 15 via an additional two fasteners 21. Such an arrangement ensures the master male member 7 is very stiff in the transverse direction and relative movement between the master male member 7 and the wing skin 4a, in this direction, is substantially prevented.

The master female member 11 and the slave female members 13 are all formed by notches in the single monolithic structure, which is attached to the wing skin 3a via a series of fasteners 23. Such an arrangement ensures the master female member 11 and the slave female members 13 are also very stiff in the transverse direction and relative movement between the female members 11, 13 and the wing skin 3a, is substantially prevented.

The slave male members 9, on the other hand, each comprise a thin neck 9b extending rearwardly from the head 9a. They are also each attached to the wing skin 4a via only two fasteners 25. Such an arrangement ensures that the slave male members 9 are less stiff than the master male member 7 and the female members 11, 13. This means that the slave male members 9 are able to flex along the neck 9b and tolerate some movement, in the transverse direction (shown by the double-headed transverse arrows in FIG. 2). The extent of allowable movement is shown in FIG. 2 by the dashed lines denoting the transverse limits of movement of each slave male member 9.

If the slave male members were the same (high) stiffness as the master male member, then the load transfer apparatus would work perfectly well in an idealised model in which each interlock between the male/female fittings is an exact fit and has no play. However, in reality, an interlock may be subjected to wear, or may otherwise have play in it due to tolerances, changes in temperature etc. In the above-mentioned idealised model in which the male members are all of the same high stiffness, once there is play in one of the interlocks, that interlock may no longer be arranged to transfer shear loads. The loads would therefore be concentrated on the remaining interlocks. In safety-critical applications that would be unacceptable.

To solve this problem it would be possible to include several redundant interlocks. However, that tends to add extra weight and bulk. The present invention recognises that by providing slave male members that are less stiff than the master slave member, the slave male members are able to tolerate some movement in the transverse direction. This means that even when play develops in the master interlock, the loads are still able to be spread between all the interlocks (i.e. the slave and master).

Figure 3:
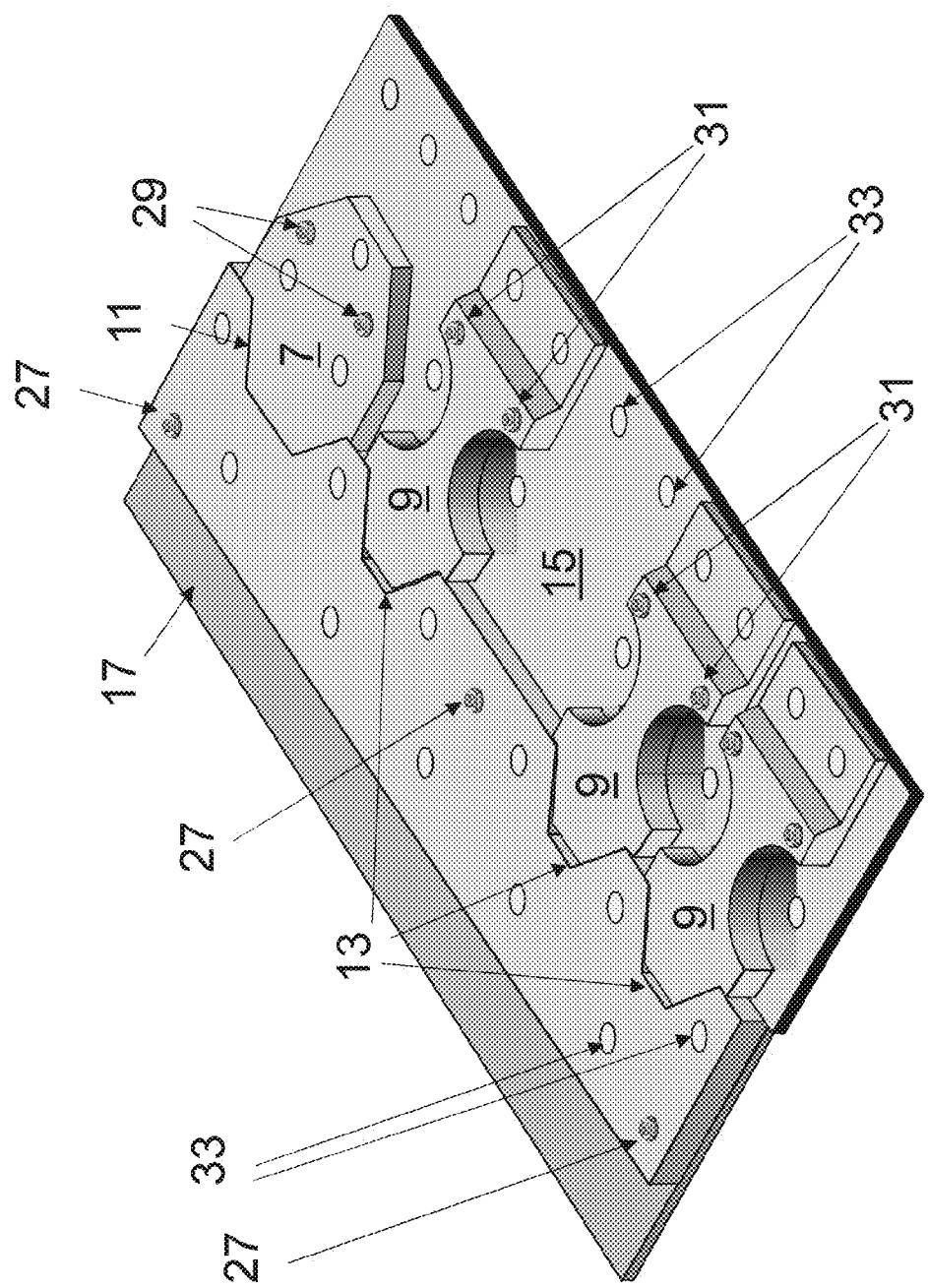
FIG. 3 shows a first stage of assembly of the apparatus in FIG. 2.
Figure 4:
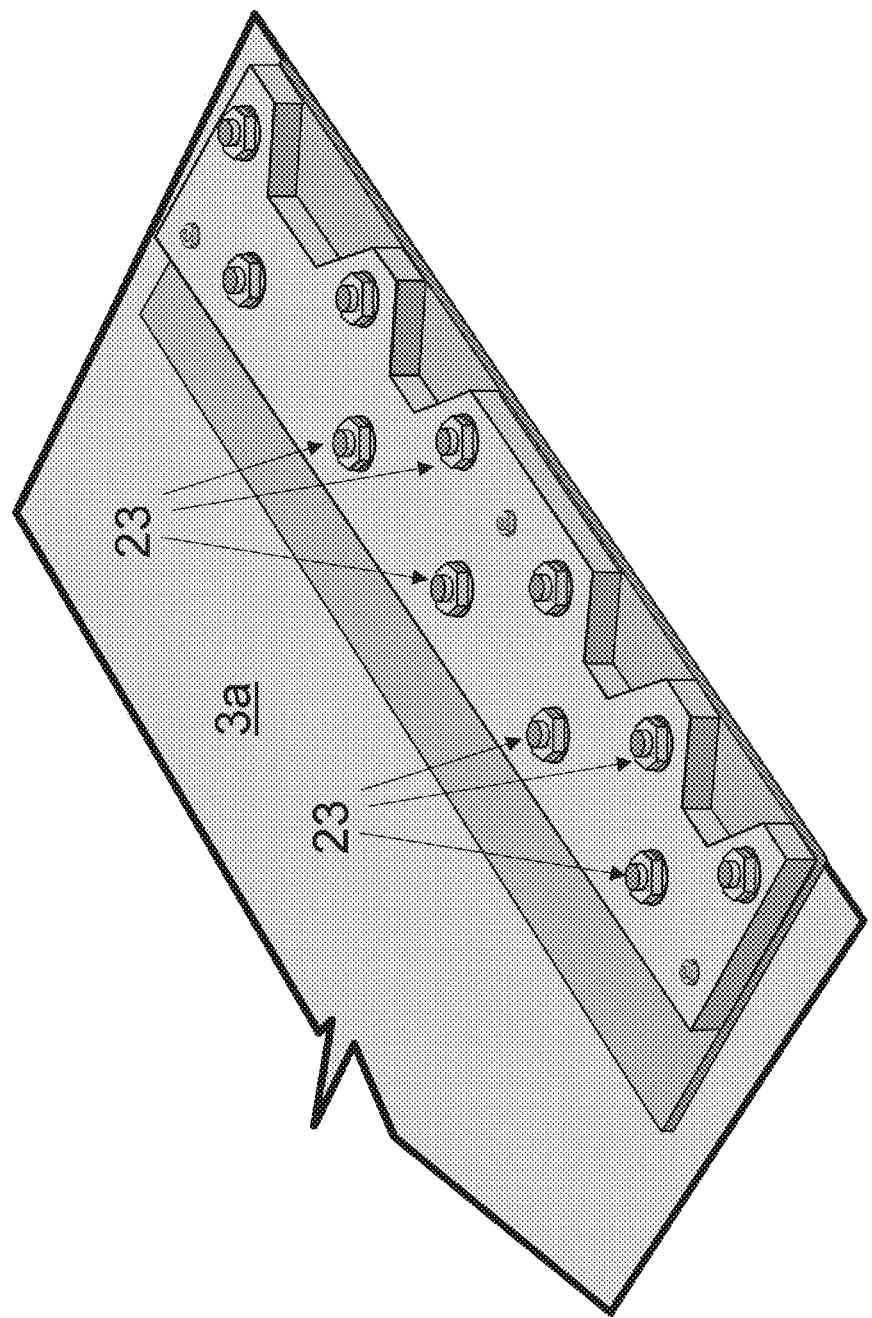
FIG. 4 shows a second stage of assembly of the apparatus in FIG. 2.

FIGS. 3 to 5 show how the apparatus of FIG. 2 is assembled.

Referring to FIG. 3, the monolithic plate comprising the female members 11, 13 is first attached to the spreader plate 17 using sub-assembly bolting 27. The master male member 7 is next attached to its spreader plate 15 using sub-assembly bolting 29. The spreader plate 15 and master male member 7 are then offered up to the master female member such that the master interlock is formed. This enables the position of the slave male members 9 to be determined by inserting the slave male members into the slave female members to form the slave interlocks. Once in position the slave male members 9 are fixed to the spreader plate 15 by sub-assembly bolting 31. Next, pilot holes 33 are drilled through several components of the assembly (e.g. both spreader plates 15, 17 and the male slave members 9). The assembly at this stage is shown in FIG. 3.

As shown in FIG. 4, the next step is to offer up the wing skin 3a on the inner wing 3 and drill and bolt through the wing skin with bolting 23.

The male members 7, 9 are then offered up to the female members 11, 13 to form the interlocks again. The wing skin 4a on the wing tip device 4 is then offered up and bolting 19 is drilled and bolted through the wing skin 4a of the tip device to attach the male members 7, 9 to the wing skin 4a. This completes the assembly process, and the apparatus at this stage is shown in FIG. 5.

Whilst the present invention has been described and illustrated with reference to particular embodiments, it will be appreciated by those of ordinary skill in the art that the invention lends itself to many different variations not specifically illustrated herein. By way of example only, the apparatus need not necessarily comprise only one master interlock; in an alternative embodiment the load transfer apparatus comprises several master interlocks and several slave interlocks. In alternative embodiments, the components need not be wing skins; they may, for example be other adjacent components in an aircraft, across which it is desirable to transfer shear loads.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing comprising a load transfer apparatus arranged to transfer transverse shear loads from a first wing skin to a second, adjacent, wing skin, the apparatus comprising a master interlock, and a plurality of slave interlocks,
the master interlock comprising a master male member associated with the first or second wing skin, received in a master female member associated with the other of the first or second wing skin, to form the master interlock,
and each of the plurality of slave interlocks comprising a slave male member associated with the first or second wing skin, received in a corresponding female member associated with the other of the first or second wing skin, to form the slave interlocks,
wherein the master male and female members are sufficiently stiff that the master male member and the master female member are fixed relative to their respective first and second wing skin, whereas each slave male member is less stiff than the master male member such that the slave male members are able to tolerate some movement, in the transverse direction, thereby enabling both the slave interlocks and the master interlock to transfer some of the transverse shear loads between the wing skins even when there is play in the master interlock.

2. A wing according to claim 1, wherein the master and slave male members are all associated with the first wing skin, and the master and slave female members are all associated with the second wing skin.

3. A wing according to claim 1 wherein the female slave members are sufficiently stiff that they are fixed to their respective wing skin.

4. A wing according to claim 1, wherein the slave members each comprise a necked region configured to reduce the stiffness of the slave members relative to the master male member.

5. A wing according to claim 1, wherein the male members each comprise a tapered region for insertion in a corresponding tapered region of the respective female member.

6. A wing according to claim 5, wherein each male member comprises two opposing transverse tapering surfaces that are configured, in the interlock, to abut two corresponding transverse tapering surfaces of the respective female member.

7. A wing according to claim 1, wherein the load transfer apparatus comprises a plurality of the master interlocks and a multiplicity of the slave interlocks.

8. An aircraft comprising the aircraft wing of claim 1.

9. An aircraft according to claim 8, wherein the wing comprises an inner wing and a wing tip device at the tip of the inner wing, the wing tip device being configurable between: (i) a flight configuration for use during flight and (ii) a ground configuration for use during ground-based operations, in which ground configuration the wing tip device is moved away from the flight configuration such that the span of the aircraft wing is reduced.

10. An aircraft according to claim 9, wherein the first or second wing skin is on the wing tip device, and the other of the first and second wing skin is on the inner wing.

11. An aircraft according to claim 8, wherein the wing skins are wing skins on the lower surface of the wing.

12. A load transfer apparatus for use as the load transfer apparatus in claim 1, the apparatus comprising a master interlock, and a plurality of slave interlocks, the master interlock comprising a master male member for associating with a first or second wing skin, and a master female member for receiving the master male member and for being associated with the other of the first or second wing skin, to form the master interlock, and each of the plurality of slave interlocks comprising a slave male member for associating with the first or second wing skin, and a corresponding female member for receiving the slave male member and for being associated with the other of the first or second wing skin, to form the slave interlocks, wherein the master male and female members are sufficiently stiff that the master male member and the master female member are fixable relative to their respective first and second wing skin, whereas each slave male member is less stiff than the master male member such that the slave male members are able to tolerate some movement, in the transverse direction, thereby enabling both the slave interlocks and the master interlock to transfer some of the transverse shear loads between the wing skins even when there is play in the master interlock.

13. A method of designing a load transfer apparatus for transferring transverse shear loads from a first wing skin to a second, adjacent, wing skin, the apparatus comprising a master interlock, and a plurality of slave interlocks, the master interlock comprising a master male member for associating with the first or second wing skin, and a master female member for receiving the master male member and for being associated with the other of the first or second wing skin, to form the master interlock, and each of the plurality of slave interlocks comprising a slave male member for associating with the first or second wing skin, and a corresponding female member for receiving the slave male member and for being associated with the other of the first or second wing skin, to form the slave interlocks, wherein the master male and female members are sufficiently stiff that the master male member and the master female member are fixable relative to their respective first and second wing skin, and wherein the method comprises the step of:

designing each slave male member to be less stiff than the master male member, the stiffness being selected such that the slave male members are able to tolerate some movement, in the transverse direction, thereby enabling both the slave interlocks and the master interlock to transfer some of the transverse shear loads between the wing skins even when there is play in the master interlock.

* * * * *